J. B. Ramp,
Pipe Coupling.
No. 112,958. Patented Mar. 21, 1871.
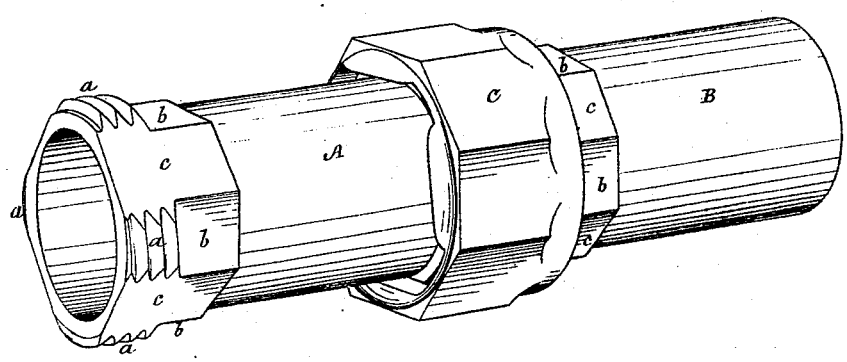
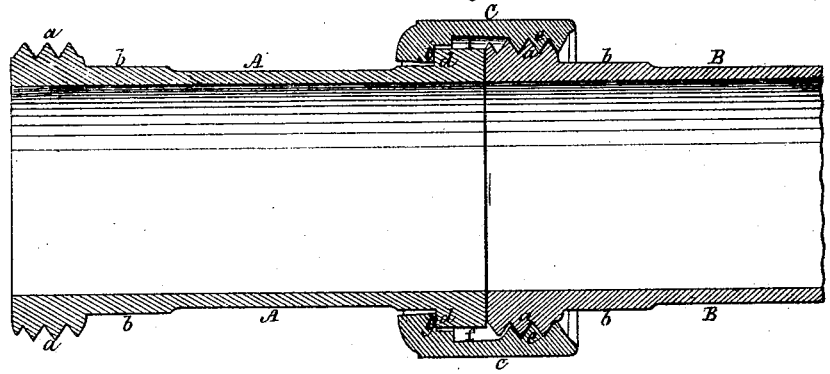
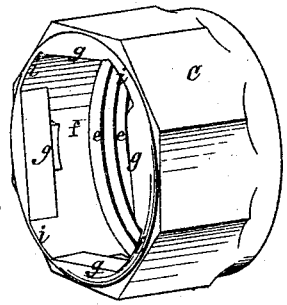
Witnesses.
W. C. Henderson
Edmund Masson
Joseph B. Ramp.
By Atty. A. B. Stoughton.

United States Patent Office.

JOSEPH B. RAMP, OF CUYAHOGA FALLS, OHIO.

Letters Patent No. 112,958, dated March 21, 1871.

IMPROVEMENT IN PIPE-COUPLINGS.

The Schedule referred to in these Letters Patent and making part of the same.

*To all whom it may concern:*

Be it known that I, JOSEPH B. RAMP, of Cuyahoga Falls, of the county of Summit and State of Ohio, have invented certain new and useful Improvements in a Coupling or Union for Cast-Iron Pipes; and that the following is a full, clear, and exact description of the same, reference being had to the accompanying drawing making a part of this specification, in which—

Figure 1 represents, in perspective, a coupling in place upon the two adjacent ends of two pieces of cast-iron pipe.

Figure 2 represents a vertical section through the same.

Figure 3 represents the coupling in perspective, and as it appears separated from the pipes.

Similar letters of reference, where they occur in the separate figures, denote like parts of the pipe and coupling in the drawing.

I am aware that very many kinds of pipe-couplings have been devised and patented, but do not know that any one prior to my invention has been so made as to furnish a close and strong joint or union, which, in any or all of its parts, can be put down, taken up in sections or pieces, or repaired with the facility that mine can be.

My invention consists in uniting the ends of two sections or pieces of pipe, one of which has a simple flange or shoulder upon it, and the other a sectional screw-thread, with sided spaces between said screw-sections, by means of a coupling or screw-sleeve, having shoulders to catch and hold against the flange-openings, to allow it to pass over the screw-sections, and an internal screw-thread to take and catch over and hold the sectional screws, and thus unite the two ends of the pipes, as will be explained.

A B represent two pieces of pipe that are united by my improved coupling C.

One end of each of the sections of pipe has upon it, first, a series of sectional screw-threads, *a a a a*, in rear of which is a sunken plane surface, *b*, and between each of the sections *a* and surfaces *b*, circumferentially, there is a series of flat or sided spaces, *c*. The opposite ends of the pipes have simply a plain flange or shoulder, *d*, upon them.

The coupling C is made as follows:

In the interior, and on that end of the coupling that takes over the screw-sections *a*, there is cast a screw-thread, *e*, of several turns.

In rear of this screw-thread the inside of the coupling, as at *f*, is plain and somewhat larger than the diameter of the flange *d*; and the end of the coupling has four shoulders, *g g*, &c., which bear against the flange *d*, and four recesses, *i i*, &c., between the shoulders *g*, to enable it to pass over the sectional screw-threads, *a a*, &c., of which there are also four.

By this construction the pipes and couplings are readily put together or taken apart.

The ends of the pipes are or may be dressed off, to make a neat close joint; or there may be a packing-ring put in between them, if so desired.

All the fastenings are cast on or with the pipes and coupling, and need no dressing or tool-fitting.

To uncouple the pipes A B, the coupling or boss C is turned until its thread *e* runs over and out of the sectional screws or screw-threads *a a*. It will then slip down and over the pipe A to the sectional screw-threads *a* on that pipe; it is then turned so that each of the sectional screw-threads is opposite the recesses *i i*, through which they will pass; then turn the pipe A, and its sectional screw-threads will take into the screw-thread *e* of the coupling, boss, or sleeve C, and will, by turning, run through said screw, and at the end of said thread be disconnected.

The pipes, as also the coupling, may have some portion of their exterior made many sided, so as to use a wrench for turning them; for it will be understood that either the pipes or the coupling may be turned in putting them together or taking them apart.

I have described and shown four sectional screw-threads and four shoulders and recesses. More or less in number may be used without changing the character of the invention.

Having thus fully described my invention,

What I claim therein as new, and desire to secure by Letters Patent, is—

In a pipe-coupling, the combination of the flanges and sectional screw-threads on the pipes, with the shoulders, recesses, and screw-thread in the coupling, boss, or sleeve, substantially as and for the purpose described.

JOSEPH B. RAMP.

Witnesses:
   J. T. HOLLOWAY,
   GEO. PARKS.